Aug. 4, 1964    M. BIDEAU    3,143,053
PHOTOGRAPHIC APPARATUS WITH AUTOMATIC EXPOSURE CONTROL
Filed Feb. 29, 1960
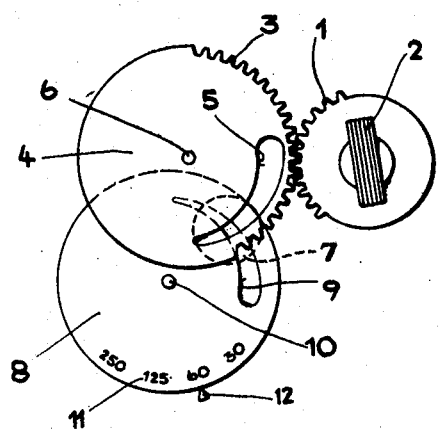
*Fig. 1*
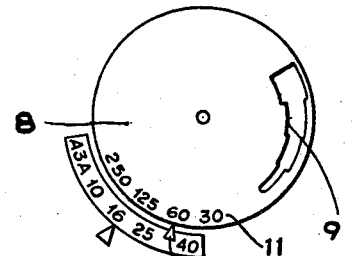
*Fig. 2*
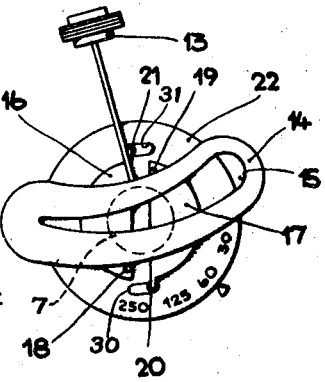
*Fig. 4*
*Fig. 3*
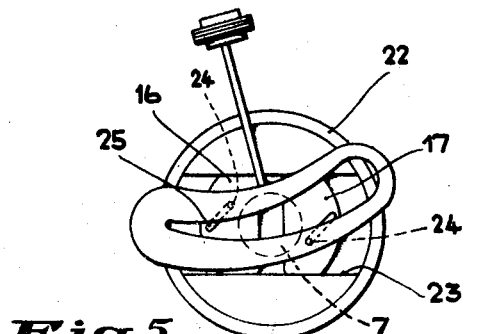
*Fig. 5*
Max Bideau
INVENTOR.
BY R. Frank Smith
Robert W. Hampton
ATTORNEYS

United States Patent Office 3,143,053
Patented Aug. 4, 1964

3,143,053
PHOTOGRAPHIC APPARATUS WITH AUTOMATIC
EXPOSURE CONTROL
Max Bideau, Joinville-le-Pont, Seine, France, assignor to
Eastman Kodak Company, Rochester, N.Y., a corporation of New Jersey
Filed Feb. 29, 1960, Ser. No. 11,722
Claims priority, application France Apr. 8, 1959
8 Claims. (Cl. 95—64)

The present invention relates to a photographic camera comprising a device for automatically regulating the exposure.

It is well known to regulate automatically the aperture of a photographic diaphragm as a function of the brightness of the subject to be photographed and it is to such a regulation or control that the expression "automatic exposure control" used herein refers. For this purpose, it is conventional to use a photocell which receives the light originating from the subject to be photographed, a galvanometer with a movable coil energized by the cell current and a diaphragm coupled to the movable coil of the galvanometer. The current delivered by the cell varies as a function of the intensity of the light reaching the cell and determines a proportional rotation of the galvanometer coil so that the diaphragm aperture is modified as a function of the lighting of the cell. In a simple arrangement of this type, the diaphragm is formed as a vane secured to the movable coil of the galvanometer the vane having an elongated, V-shaped aperture which cooperates with a fixed aperture disposed along the path of light rays passing through the picture-taking objective. When the galvanometer coil turns as a function of the intensity of the incident light, the diaphragm vane turns with the coil in such a way that a larger or smaller fraction of its aperture width is superimposed on the fixed aperture.

In order to permit the use of the central region of the taking objective, whatever may be the size of the composite diaphragm aperture, thereby to obtain an image of satisfactory optical definition and a uniform distribution of light in the true image plane, it is also known to use a second diaphragm vane, the two vanes being driven in opposite directions and being operated in such a way that the aperture of one vane orthogonally intersects the aperture of the other vane.

The known arrangements have the disadvantage that they permit exposure control only for fixed values of exposure factors other than the brightness, for example such exposure values as shutter speed or film sensitivity. This disadvantage can be overcome by including in the circuit connecting the galvanometer to the cell a variable resistance which is regulated as a function of the shutter speed being used and/or as a function of the film sensitivity, but such an arrangement is relatively complicated.

The invention has for its primary object the provision of a photographic camera comprising automatic exposure control apparatus of the type previously referred to, such apparatus being arranged so that it can easily be adjusted as a function of shutter speed and/or film sensitivity, by means of a very simple mechanism.

The photographic camera according to the invention comprises a movable diaphragm vane having an elongated, tapered aperture, the longitudinal axis of which extends through the optical axis of the objective in all positions of the vane, a device for modifying the position of the vane as a function of the light received by a cell, a masking device movable independently of the diaphragm vane and arranged to intercept an adjustable fraction of the light transmitted through the vane aperture and a control device for modifying the adjustment of the movable masking device.

According to one embodiment, the movable masking device comprises a second diaphragm vane having a second elongated, tapered aperture, the longitudinal axis of which extends through the optical axis of the objective in all the positions of the second vane and intersects the longitudinal axis of the aperture in the first vane.

According to another embodiment, the movable masking device comprises two movable masking members in the same or closely adjacent planes, which can be moved towards or away from each other in order to define between them a slot of adjustable width, the longitudinal axis of which slot intersects the longitudinal axis of the aperture in the diaphragm vane.

The means for adjusting the principal diaphragm vane as a function of the lighting received by a cell advantageously comprises a movable-coil galvanometer, which is energized by the cell, the vane being directly mounted on said coil, for example as fully shown in U.S. Patent No. 2,297,262.

It is also advantageous for the control device, which modifies the position of the movable masking device, to comprise a member for setting the shutter speeds and a coupling between the said setting member and the movable masking device. A typical coupling, in this instance a gear coupling, of a shutter speed setting member to another member is illustrated in U.S. Patent No. 2,285,761.

Other objects of the invention will appear from the following description, reference being made to the accompanying drawing, wherein:

FIG. 1 is a diagrammatic front view of one embodiment of the invention;

FIG. 2 shows another type of diaphragm aperture that can be used in the embodiment illustrated in FIG. 1.

FIGS. 3 and 4 are diagrammatic front views of a second embodiment of the invention in two different positions of operation; and FIG. 5 is a diagrammatic front view of a third embodiment of the invention.

According to the embodiment shown in FIG. 1, a toothed sector 1 is connected to the movable coil 2 of a galvanometer, which is excited by the output current of a cell (not shown) receiving the incident light. Sector 1 meshes with a toothed sector 3 on a diaphragm vane 4, which has an elongated, tapered aperture 5. Vane 4 is mounted for rotation about an axis 6 so that when the galvanometer coil 2 turns as a function of the lighting of the cell, a larger or smaller fraction of aperture 5 uncovers the taking-lens 7 in a known manner. According to the invention, there is included an additional diaphragm means or a masking member 8, which has an aperture 9 similar to aperture 5 of vane 4 and is mounted for rotation on an axis 10 so that a portion of aperture 9 is aligned with aperture 5 to form a composite exposure aperture over the central area of the taking lens. The assembly is so arranged that aperture 9 is displaced orthogonally with respect to aperture 5. The masking member 8 is secured or coupled to a shutter speed setting member (not shown) and can carry a shutter speed scale 11 cooperating with a fixed index 12.

In the embodiment shown in FIG. 1, the width of aperture 9 decreases in one direction so that the portion of this aperture that cooperates with the portion of aperture 5 disposed in front of the taking lens 7 becomes smaller as the shutter speed setting is reduced. It is thus possible to modify the shutter speed without modifying the quantity of light reaching the taking lens; once the shutter speed has been chosen, the quantity of light reaching the taking lens depends upon only the position of vane 4, which, as already indicated, depends only on the amount of light received by the cell. There is thus obtained an automatic control of the exposure as a function of the subject or scene lighting, whatever may be the selected shutter speed.

The invention is not limited to a particular form given to the apertures 5 and 9. For example, it is possible to replace aperture 9 of the masking member 8 by a succession of slots of different widths, as indicated in FIG. 2.

Similarly, instead of being coupled by a gearing to the galvanometer coil 2, the vane 4 can be carried directly by the coil 2, in the manner shown in FIGS. 3 to 5.

If desired, the position of the masking member 8 can be modified as a function of film sensitivity instead of as a function of the shutter speed, in which case the masking member 8 is not connected or coupled to the shutter speed setting member and the shutter speed scale 11 is replaced by a sensitivity scale. According to another embodiment illustrated in FIG. 2, the masking member 8 is connected to the shutter speed setting member and carries a shutter speed scale 11, this scale is associated with an index 12 which, instead of being fixed, is placed in different positions on the periphery of the masking member 8 as a function of the film sensitivity.

For constructional reasons, the aperture 9 in the masking member 8 can be replaced, according to another embodiment shown in FIGS. 3 and 5, by two masking members which are moved toward or away from each other as a function of the selected shutter speed.

According to the embodiment shown in FIG. 3, the movable coil 13 of the galvanometer directly carries a vane 14 which has an aperture 15 similar to the aperture 5 of vane member 4 of the embodiment shown in FIG. 1. Vane 14 serves the same purpose and functions in the same way as vane 4 in FIG. 1. Each of a pair of semi-circular masking members 16 and 17 is mounted at one end for turning movement on a respective fixed axis 18 or 19 and carries at its other end a respective tongue 20 or 21, which extends into a corresponding slot 30 or 31 in the shutter speed setting member 22. When this setting member is rotated, the masking members 16 and 17 move towards or away from ach other, depending on the direction of rotation of member 22, the rectilinear edges of the masking members 16 and 17 remaining parallel to each other to form a rotating slot-shaped aperture of varying width. For example, the masking members 16 and 17 are shown set for an exposure of $\frac{1}{125}$ in FIG. 3 and for an exposure of $\frac{1}{60}$ in FIG. 4.

According to the embodiment shown in FIG. 5, the masking members 16 and 17 are displaced in a fixed slideway 23 and each of them carries a respective pin 24 engaging in a corresponding slot 25 of the shutter speed setting member 22. As in the preceding embodiment, when the shutter speed setting member 22 is turned in one direction or the other, the masking members 16 and 17 approach or move away from each other.

As indicated in connection with the embodiment shown in FIG. 1, the masking members 16 and 17 can, if desired, be used for taking into account the film sensitivity and not the shutter speed. Similarly, the position of the index cooperating with the shutter speed scale can be adjustable as a function of the film sensitivity as shown in FIG. 2, thus making it possible to compensate simultaneously for the shutter speed and film sensitivity.

The invention has been described in detail with particular reference to preferred embodiments thereof, but it will be understood that variations and modifications can be effected within the spirit and scope of the invention as described hereinabove and as defined in the appended claims.

I claim:

1. In a camera having mans for focusing an image of a scene onto a photosensitive surface, a manually adjustable first exposure-factor-setting device, and an exposure meter including a member movable automatically to a position corresponding to scene brightness, the combination including: a second exposure-factor-setting device comprising a movable diaphragm vane having a tapered aperture and coupled to said member for movement therewith, the aperture being arranged to enable various portions thereof to be aligned with said focusing means in response to the movement of said member; and additional diaphragm means overlapping a part of said vane and adjustable to any of a plurality of stable positions, the additional diaphragm means being coupled to said first exposure-factor-setting device for manual adjustment therewith and defining means to partially mask the vane aperture portion aligned with the focusing means by an amount varying with the adjustment of the additional diaphragm means, the vane aperture portion and masking means co-operating to define a composite exposure aperture compensating for both of said exposure factors.

2. The combination defined in claim 1, wherein said first exposure-factor-setting device comprises a shutter speed setting device.

3. The combination defined in claim 1, wherein said first exposure-factor-setting device comprises a film sensitivity setting member.

4. The combination defined in claim 1, wherein said additional diaphragm means carries scale indicia cooperating with complementary scale indicia disposed adjacent said additional diaphragm means.

5. The combination defined in claim 4, with a member movable to set a third exposure factor and carrying said complementary scale indicia.

6. The combination defined in claim 1, wherein said vane comprises a first disk angularly movable about a first axis and said additional diaphragm means comprises a second disk angularly movable about a second axis and having a second, elongated, tapered aperture moving orthogonally with respect to said vane aperture.

7. The combination defined in claim 1, wherein said additional diaphragm means comprises a pair of D-shaped members having opposed, spaced, substantially flat surfaces forming a slot crossing said vane aperture in alignment with said focusing means, with: respective means for pivoting each of said D-shaped members near one end of the substantially flat surface thereof; and a respective pin-and-slot coupling between each of said D-shaped members and said first exposure-factor-setting device near the other end of the substantially flat surface of said D-shaped member, the pivot of each D-shaped member being in opposed spatial relation to the pin-and-slot coupling of the other D-shaped member, whereby angular movement of said first exposure-factor-setting device rotates each D-shaped member about its respective pivot to angularly move and vary the width of said slot.

8. The combination defined in claim 1, wherein said additional diaphragm means comprises a pair of D-shaped members having opposed, spaced, substantially flat surfaces forming a slot crossing said vane aperture in alignment with said focusing means, said D-shaped members having respective pin-and-slot couplings to said first exposure-factor-setting device, with: means for linearly guiding said D-shaped members for substantially linear movement toward or away from each other to vary the width of said slot in response to adjustment of said first exposure-factor-setting device.

References Cited in the file of this patent

UNITED STATES PATENTS

| 2,841,064 | Bagby et al. | July 1, 1958 |
| 2,955,519 | Sommer | Oct. 11, 1960 |
| 2,999,446 | Hautmann et al. | Sept. 12, 1961 |

FOREIGN PATENTS

| 1,165,534 | France | June 2, 1958 |